United States Patent [19]

Chambolle

[11] 4,096,417

[45] Jun. 20, 1978

[54] APPARATUS FOR DRIVING AND TENSIONING A PRINTING RIBBON FOR A PRINTER

[75] Inventor: Jacques André Chambolle, Danjoutin, France

[73] Assignee: Compagnie Internationale pour l'Informatique Cii-Honeywell Bull (Societe Anonyme), Paris, France

[21] Appl. No.: 736,307

[22] Filed: Oct. 28, 1976

[30] Foreign Application Priority Data

Nov. 3, 1975 France ................................ 75 33579

[51] Int. Cl.[2] ................................................ H02P 1/42

[52] U.S. Cl. ........................................... 318/7; 318/57

[58] Field of Search ...................................... 318/7, 57

[56] References Cited

U.S. PATENT DOCUMENTS

| | | | |
|---|---|---|---|
| 3,210,342 | 1/1973 | Highley | 318/6 |
| 4,025,830 | 5/1977 | Delaporte | 318/6 |

*Primary Examiner*—B. Dobeck

*Attorney, Agent, or Firm*—Cameron, Kerkam, Sutton, Stowell & Stowell

[57] ABSTRACT

A ribbon driving and tensioning apparatus includes a pair of identical mechanical assemblies connected to reversibly drive associated rollers which support a printing ribbon. Each assembly includes a bi-directional DC reduction motor the output shaft of which is connected through a friction clutch assembly to the supporting shaft of a roller. The roller shaft includes a brake for applying a resisting torque in a direction opposite to that of the shaft rotation. A switching assembly for reversing the current to the motors and thereby reverse the direction of drive of the motors includes a pair of reversing switches mechanically coupled to a lever adapted to be pivoted between a first and a second position by a strip actuator positioned on the ribbon. A strip actuator is positioned adjacent opposite ends of the ribbon such that the direction of travel of the ribbon is reversed when the ribbon is almost completely unwound from one of the rollers.

10 Claims, 6 Drawing Figures

Figure 2

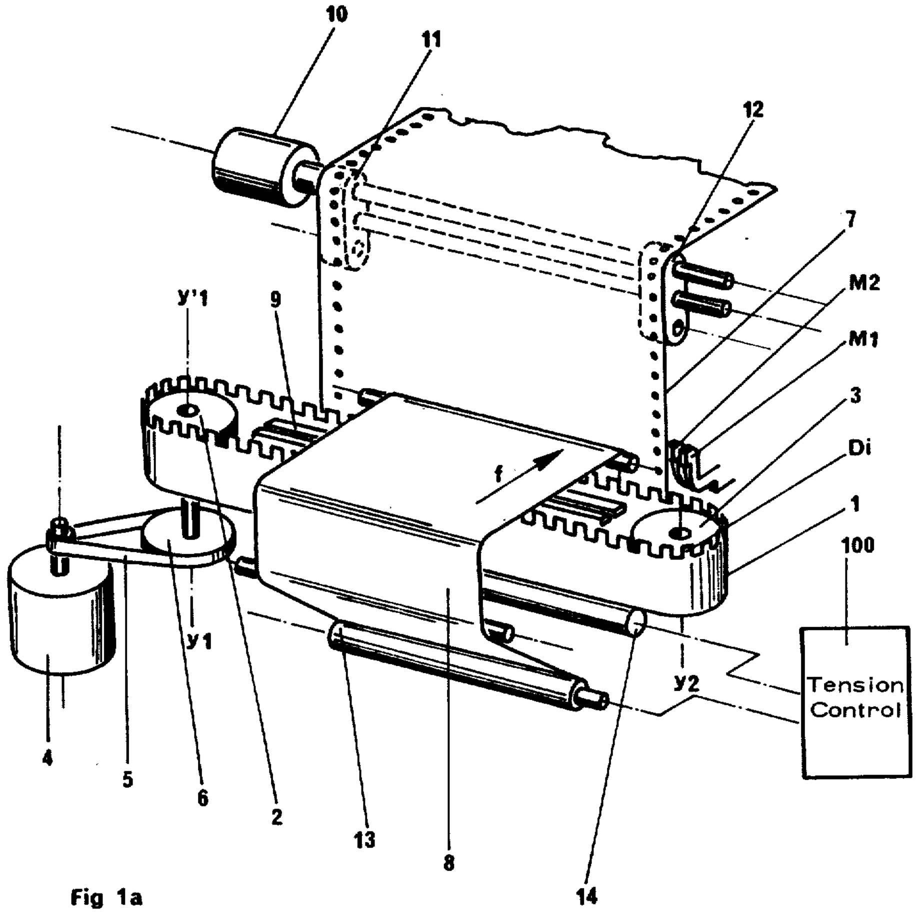
Fig 1a
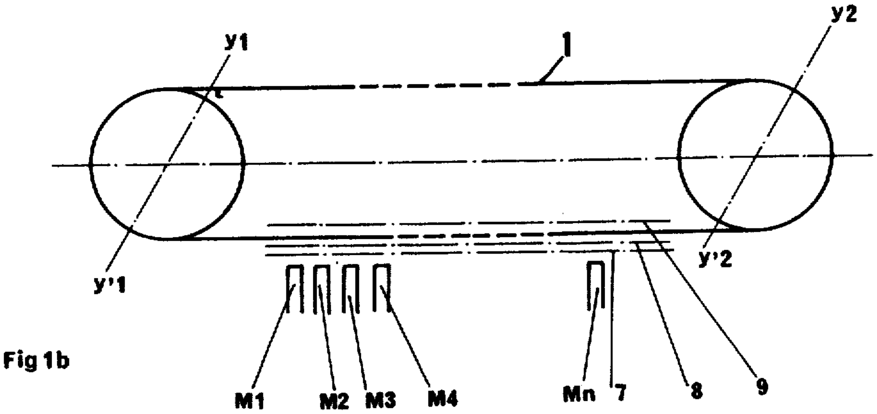
Fig 1b
Figure 1

APPARATUS FOR DRIVING AND TENSIONING A PRINTING RIBBON FOR A PRINTER

CROSS REFERENCE TO RELATED APPLICATIONS

This application corresponds to French application 75 33579 filed in France on Nov. 3, 1975 for which priority is claimed.

BACKGROUND OF THE INVENTION

1. Field of the Invention

The present invention relates to apparatus for driving and tensioning the printing ribbon of a printer.

2. Description of the Prior Art

In present day printers, a character carrier is caused to move past a writing support, that is to say a combination of printing paper and inking ribbon. The character carrier makes a cyclic movement such that all the characters which can be printed become available at each printing position. Each printing position has a corresponding actuator which releases or activates a print hammer at the required time, that is to say when the character to be printed is disposed in the appropriate position for printing.

The main types of character carriers are drums of the rotary type or else chain-linked characters or character-bearing belts which move in a straight line.

Given the nature of the duties which they are called upon to perform, it is necessary for printers consistently to provide printing of a high standard and which ensures that the characters printed are perfectly legible. To this end, it is necessary, on the other hand, for a single ribbon to be capable of providing a large number of high grade impressions when passed through the printer a number of times in both directions and on the other hand, for this ribbon to be under constant and adequate tension so that it will always be very accurately positioned relative to the printing paper and the character carrier. In this way, the ribbon is prevented from transferring too much ink to the character carrier and the paper, which are thus kept cleaner so as to minimize maintenance.

In the particular case where the character carrier is an endless type-bearing belt, the upper edge of which is provided with a plurality of character-bearing fingers in the form of flexible tongues, any slackening of the ribbon is likely to cause jamming or foul up of the ribbon in and between the fingers. This could result in damage, on the one hand, to the ribbon itself and, on the other hand, to one or more character-bearing fingers. It is, therefore, important that the arrangement for tensioning the ribbon should be safe and reliable.

Arrangements for tensioning printing ribbons which meet these requirements are known, but generally require large numbers of mechanical parts and are costly.

Whatever the type of arrangement employed, the ribbon is normally tensioned between two support rollers one of which is responsible for winding the ribbon off and the other for winding it on.

In one known arrangement, a single reduction motor (an electric motor associated with a speed reducer) is mechanically coupled to both of the support rollers by a system of gears associated with two braking clutches (preferably of the electromechanical type), the first of which is mechanically coupled to the winding-on support roller and the second to the winding-off support roller. When the first braking clutch is driving, the second braking clutch is disengaged, but brakes the winding-off support roller to which it is coupled and thus, allows the ribbon to be tensioned.

This first arrangement has several known disadvantages. On the one hand, because of the large number of mechanical parts required, it is difficult to manufacture and its cost of manufacture is high. Further, it is always possible for the ribbon to slacken as a result of faults which may occur in the voltage supply to the electromechanical brake resulting in damage to the ribbon or the fingers.

In a second known arrangement, each of the support rollers is mechanically coupled to a reversible reduction motor, with the resisting torque from the reduction units being less than or equal to the braking torque required to tension the ribbon. The motor part of the reduction motor associated with the winding-off roller is supplied with less than its rated supply voltage so that the total resisting torque from the reduction motor enables the ribbon to be suitably tensioned. The motor is used as a brake and its resisting torque is added to the resisting torque from the reduction unit.

This arrangement also has several drawbacks. For example, it is known that in such arrangements the braking torque is not constant because the speed of the winding-off roller varies from $-40\%$ to $+40\%$ on averge relative to the nominal speed of the motor. Therefore, it is difficult to obtain a relatively constant braking torque. Further, the price of the reduction units of the reduction motors is very high because they have to be extremely accurate.

Both of the aforementioned arrangements for tensioning a printing ribbon incorporates a device for gauging or monitoring the tension of the ribbon so that it is known at all times whether the ribbon is correctly tensioned. This further adds to the cost of the arrangement.

SUMMARY OF THE INVENTION

The present invention substantially reduces or overcomes these disadvantages and provides a versatile and inexpensive apparatus for driving and tensioning the printing ribbon of a printer. This ensures that the ribbon is tensioned with complete reliability and makes it unnecessary to use a device for gauging the tension of the ribbon. A primary feature of the present invention is to provide an improved arrangement for driving and tensioning a printing ribbon for a printer employing bi-directional driving means for rotatably driving the winding-off roller and winding-on roller with means to prevent the output shafts of the bidirectional driving means from rotating when the said driving means are at rest, i.e., in a non-driving condition.

In accordance with the present invention, the printing ribbon is tensioned between a winding-on roller and winding-off roller, and the arrangement for driving and tensioning the printing ribbon consists of:

a first and a second mechanical assembly connected to the winding-on roller. The first mechanical assembly includes bi-directional rotary drive means whose output shaft is prevented from rotating when the drive means are at rest. The output shaft is coupled by a free-wheel or friction clutch arrangement to a second shaft on which a permanent brake acts. The end of the second shaft is attached to the winding-on roller.

The second mechanical assembly is identical to the first mechanical assembly and is connected to the winding-off roller.

It should be noted that use of the terms "winding-on" and "winding-off" are relaive terms which depend on the direction the rollers are driven. When one roller is winding on, the other roller is winding-off.

BRIEF DESCRIPTION OF THE DRAWINGS

The invention will be better understood from the following description, which refers to the accompanying drawings and which describes a preferred embodiment of the invention, by way of non-limiting illustration. In the drawings:

FIG. 1 is a simplified general diagrammatic view of a printer whose character carrier is an endless belt, FIG. 1*a* being a perspective view and FIG. 1*b* a view from above;

DESCRIPTION OF THE PREFERRED EMBODIMENT

Figures 2, 2A, 2B:
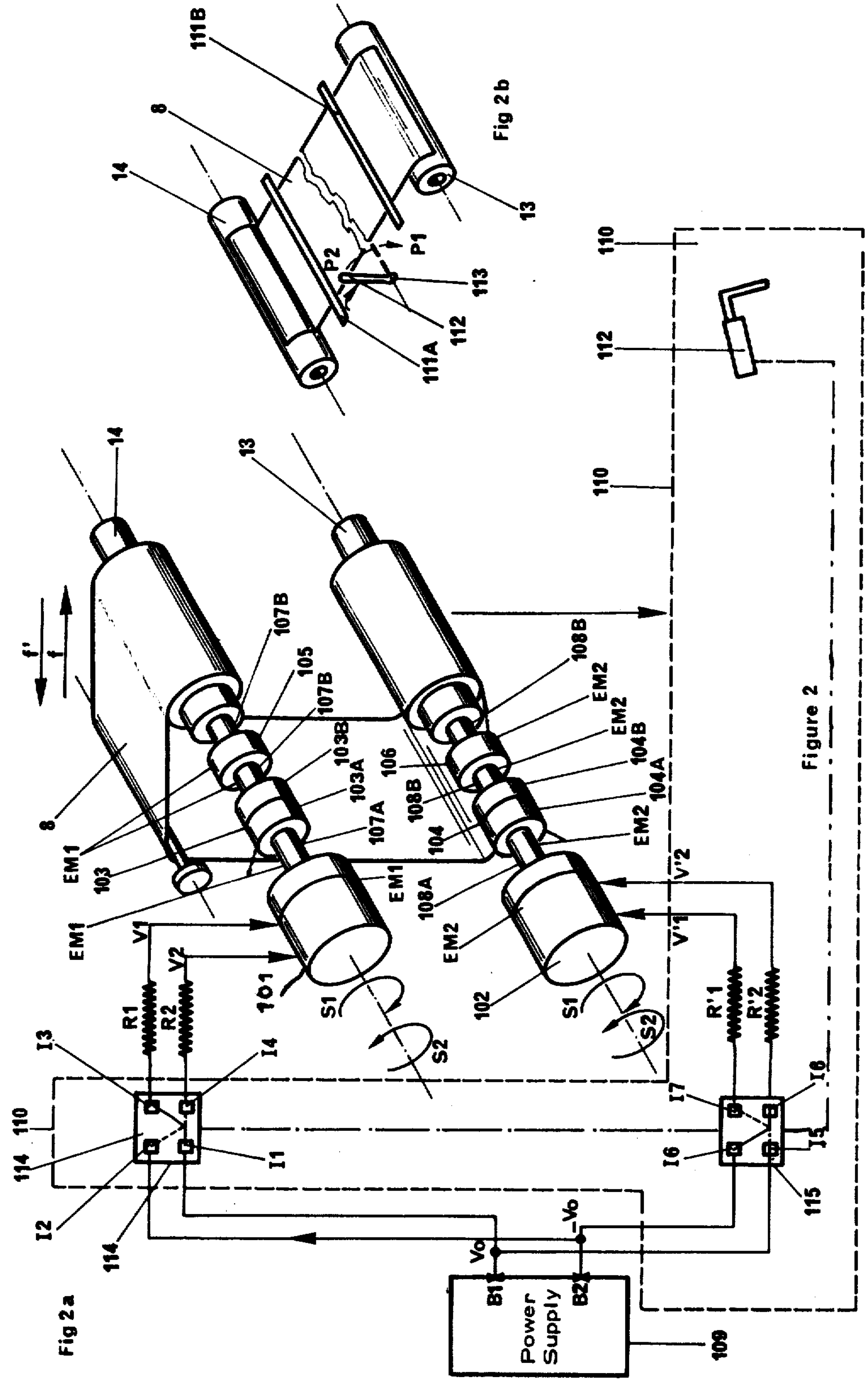
FIG. 2 is a perspective diagramatic view of an arrangement according to the present invention for tensioning the printing ribbon of a printer.
FIG. 2*b* is a diagramatic view of the arrangement for reversing the current to the reduction motors.

The preferred embodiment of the invention for driving and tensioning a printing ribbon will now be described in connection with a printer whose character carrier is an endless type-carrying belt, but it will be readily apparent to anyone skilled in the art that the arrangement according to the invention may be utilized with other forms of printers, whatever the type of character carrier employed (a drum, chain-linked characters, etc.).

The invention will be better understood if one briefly reviews the principles of construction and operation of a printer having an endless character-bearing belt.

Thus, as shown in FIG. 1, the endless character-bearing belt 1 is mounted under tension on two pulleys 2 and 3 whose axes of rotation Y1 Y'1 and Y2 Y'2 are vertical. As shown in FIG. 1, pulley 2 is a drive pulley and is driven at a constant speed of rotation by an electric motor 4 via a belt 5 and a pulley 6.

Preferably, the belt 1 is a flexible metal belt made of steel. Along the top edge of the belt, there is provided a plurality of character-bearing fingers Di in the form of resilient tongues. The printer has a plurality *n* of hammers M*n* of which only hammers M1 and M2 are shown in FIG. 1*a* and hammers M1, M2, M3, M4......M*n* in FIG. 1*b*. The endless belt 1 is driven in a linear manner at a constant speed between, on the one hand, the hammers M*n*, the printing paper 7 and the inking ribbon 8 and, on the other hand, a backing 9. The printing paper 7 is moved by an electric motor 10 associated with sprocket-drives 11 and 12.

The inking ribbon 8 is tensioned between two support rollers 13 and 14 shown diagramatically in FIG. 1*a*, by a drive and tensioning arrangement 100 which will be hereinafter described in greater detail. The arrangement 100 for tensioning the ribbon 8 is represented in FIG. 1*a* by a rectangle which is connected to the two support rollers 13 and 14 by broken lines.

Whilst the paper is being printed on, that is to say while a larger number of consecutive lines of print are being formed in a printing sequence, the inking ribbon 8 is advanced at a slow speed, in the direction of arrow *f*, for example, and passes between the printing paper 7 and endless belt 1. Support roller 14 thus acts as the winding-on roller and support roller 13 as the winding-off roller. When the direction of advancement of ribbon 8 is reversed, the function of the rollers reverses and support roller 14 acts as a winding-off roller, while roller 13 becomes the winding-on roller. When the interval between two printing sequences is relatively long (of the order of several seconds) the movement of the ribbon is stopped. Reversal of the function of the rollers is automatically completed. To this end, when the whole of the ribbon has been wound onto roller 14 its direction of movement as well as that of roller 13 is reversed. Roller 14 then acts as the winding-off roller and roller 13 as the winding-on roller.

The various component parts of the arrangement 100 according to the preferred embodiment of the invention are shown in FIG. 2*a*. A first mechanical assembly EM1 is connected to roller 14. This assembly consists of a DC reduction motor 101 and its output shaft 107A, a free-wheel or friction clutch 103, a permanent brake 105, a shaft 107B secured to roller 14. A second mechanical assembly EM2 is connected to roller 13, and consists of: a DC reduction motor 102 and its output shaft 101A, a free-wheel or friction clutch 104, a permanent brake 106 and a shaft 108B secured to the roller 13.

Power supply circuit 109 supplies DC voltage to the reduction motors 101 and 102 and a switching arrangement 110 is provided for reversing the current to the reduction motors 101 and 102 upon actuation of the switches 114, 115 from a first to a second position. As should be apparent, the mechanical assemblies EM1 and EM2 are identical.

In the present embodiment, known reduction motors are used such as the number 82774 SP 1306 motors made by Messrs. Crouzet, a French corporation. These reduction motors 101 and 102 are formed by the combination of a bi-directional DC motor and a reduction unit have a very high step-down ratio. The field circuit (stator) of the motor is a permanent magnet whilst the armature is fed with DC current from the supply circuit 109. When no DC current is supplied to the armature of the motor, the motor is in an "at rest" position. In this position, it is impossible to turn the output shaft of the reduction unit in either direction. This is due to a combinatin of two factors, namely, the stator of the DC motor is a permanent magnet, and the very high step-down ratio of the reduction unit.

In conclusion, it can be said that it is impossible to turn the output shafts of the reduction motors 101 and 102 when they are not running. Such reduction motors as hereinbefore indicated, are known and commercially available.

The output shafts 107A and 108A of reduction motors 101 and 102 are coupled to shafts 107B and 108B, respectively, via free-wheels or friction clutches 103 and 104 which themselves consist of two parts 103A and 103B, and 104A and 104B. For the sake of simplicity, these parts will be termed free-wheel halves. Permanent brakes 105 and 106 act on shafts 107B and 108B.

In a preferred embodiment of the invention the permanent brakes 105 and 106 are magnetic brakes of a known type containing permanently magnetized powder. It is clear that any other type of permanent brake would be suitable.

The reduction motors 101 and 102, the permanent brakes 105 and 106, and the rollers 13 and 14 are attached to the framework of the printer by suitable means which are now shown in order to simplify FIG. 2*a*.

Referring to FIG. 2*b*, the arrangement 110 for reversing the current to the reduction motors 101 and 102 consists of a pair of strips 111A and 111B secured adjacent opposite ends of ribbon 8, a cooperating switch actuating lever 112 and switches 114 and 115. Strip 111A is attached transversely to the ribbon 8 near that end of the ribbon which is secured to the roller 14. Strip 111B is identical to the first strip and is attached transversely to ribbon 8 near that end of the ribbon which is secured to roller 13. A lever 112 is pivoted to the framework of the printer at 113 and is able to take up two positions *p*1 and *p*2. The current reversing switches 114 and 115 are operated by lever 112 in corresponding first and second positions, depending on which position switch lever 112 takes up.

When the ribbon 8 has been almost fully wound onto roller 13, strip 111A pushes against lever 112 and the lever moves from position *p*2 to position *p*1 and acts on the reversing switches 114 and 115, its action being represented by a broken line in FIG. 2*a* causing the reversing switches 114 and 115 to be switched from a first to a second position.

Reversing switch 114 has four terminals I1 to I4, and reversing switch 115 has four terminals I5 to I8. Terminals I1, I2, I5 and I6 serve as input terminals and terminals I3, I4, 17 and I8 serve as output terminals.

It will be assumed that the normal direction of rotation of reduction motor 101 is that indicated by arrow S1 (see FIG. 2*a*), at which time roller 14 is the winding-on roller, and the direction of rotation indicates by arrow S2 will be defined as the reverse of the motor's normal direction of rotation, at which time roller 14 becomes the wnding-off roller.

The normal direction of rotation of reduction motor 102 is that indicaed by arrow S2, at which time roller 13 is the winding-on roller, while its "reverse" directon of rotation is indicated by arrow S1, at which time roller 13 becomes the winding-on roller.

It will also be assumed that the DC supply voltage to the armature which corresponds to the normal direction of rotation of either of reduction motors 101 and 102 is a positive one.

The DC supply circuit 109 supplies a positive DC voltge VO from its output B1 and a negative voltage −VO from its output B2. Output B1 of circuit 109 is connected on the one hand to input terminal I1 of reversing switch 114 and on the other hand to input terminal I5 of reversing switch 115. Output B2 of circuit 109 is connected, on the one hand, to input terminal I2 of reversing switch 114 and, on the otherhand, to input terminal I6 of reversing switch 115. The output terminals I3 and I4 of reversing switch 114 are connected to the armature of reduction motor 101 via respective resistors R1 and R2. The output terminals I7 and I8 of reversing switch 115 are connected to the armature of reduction motor 102 via respective resistors R'1 and R'2. Resistors R1 and R'1 are of the same value, which is less than the equalized value of the two resistors R2 and R'2.

The operation of the arrangement 100 for tensioning the inking ribbon 8 may be broken down into three separate phases which are as follows:

A. First phase: Ribbon being unwound in the direction of arrow *f*

It will be assumed that, at the start, the printing ribbon 8 is fully wound onto roller 13. Roller 14 is, therefore, the winding-on roller and roller 13 the winding-off roller. Lever 112 is in position *p*1 connecting the terminals I1 to I3 and I6 to I8. Reduction motor 101 is energized to turn in the direction of arrow S1. Its armature is supplied with a positive DC volatge V1 through terminals I1 and I3 of reversing switch 114. Terminals I2 and I4 are not connected. Voltage V1 is less than V0 owing to the presence of resistor R1. Free-wheel half 103A, which turns at the same speed as the output shaft 107A of reduction motor 101, applies a positive drive to the free-wheel half 103B and the later in turn drives shaft 107B and roller 14 at a constant speed of rotation VC. Permanent brake 105 applies to shaft 107B a resisting torque in the direction arrow S2, whch is the opposite direction from that of arrow S1. As ribbon 8 moves in the direction of arrow *f* and winds onto roller 14, the combined diameter of roller 13 and ribbon 8 decreases. Because of this the speed of rotation of winding-off roller 13 increases from an initial speed VCI, which is less than speed VC, to a final speed VCM which is greater than VC. IN the embodiment presently being described, $VCI = 0.7$ VC and $VCM = 1.5$ VC.

As the ribbon is wound onto roller 14, roller 13 turns free-wheel half 104B in the direction of arrow S1. If no DC voltage were fed to the armature of the reduction motor 102, free-wheel half 104B would not be able to drive free-wheel half 104A and the output of shaft 108A of reduction motor 102 owing to the impossibility of turning the shaft when reduction motor 102 is not running. This in turn would cause the ribbon to break. It is necessary to supply power to the reduction motor to cause it to turn in direction S1, whch is the reverse of its normal direction of rotation, so that free-wheel half 104A will always turn faster than free-wheel half 104B. It can be seen that, under these conditions, free-wheel half 104A slips with respect to free-wheel half 104B. The armature of reduction motor 102 is therefore supplied with a negative DC voltage V'2, through terminals I6 and I8 of reversing switch 115. Terminals I5 and I7 are disconnected. The absolute value of voltage V'2 is less than VO owing to the presence of resistor R2. In terms of absolute value, it is also less than V1 since reductor motor 102 is turning under practically no load. Permanent brake 106 applies to shaft 108B a resisting torque in the opposite direction from that of arrow S1. During this phase, the ribbon is tensioned by permanent brakes 105 and 106.

When ribbon 8 has been almost completely unwound, the strip 111B of the reversing arrangement 110 pushes against lever 112, until it moves from position *p*2 to *p*1. Lever 112 acts on reversing switches 114 and 115 such that terminals I2 and I4, I5 and I7 are connected and terminals I1 and I3, I6 and I8 are disconnected.

The second phase of operations may then begin.

B. Second phase: Ribbon moving in the direction of arrow *f*

The second phase proceeds in exactly the same way as the first phase: reduction motor 102 turns in the direction indicated by arrow S2, its armature being fed with the positive voltage V'1. It drives roller 13 (which is now the winding-on roller) at a constant speed VC. Reduction motor 101, which is supplied with a voltage V2, turns at a speed of VCM, as also does free-wheel half 103A, whilst roller 14 (which is now the winding-off roller) and free-wheel half 103B turn at a speed which varies between VCI and VCM.

C. Third phase: Ribbon tensioned while stationary

Between two printing sequences the ribbon is stationary when no DC voltage is fed to the two reduction motors 101 and 102 from supply circuit 109. Because it is impossible for the output shafts 107A and 108A to turn while reduction motors 101 and 102 are stopped, the free-wheel halves 103A and 104A remain immobilized and are thus, usable to drive either free-wheel half 103B in the directon of arrow S2 or free-wheel half 104B in the direction of arrow S2. It is, therefore, impossible for the ribbon to be slackened. Tension is thus maintained on the ribbon when stationary with a high degree of reliability.

In addition, the fact that it is impossible to turn the output shafts of the reduction motors 101 and 102 when they are stopped makes it possible to alleviate the disadvantages which result from the characteristics of the permanent brakes 105 and 106 altering with time, these brakes likewise opposing any slackening of the ribbon 8.

I claim:

1. Apparatus for driving and tensioning a printing ribbon between a first roller and a second roller supported on respective first and second rotatable shafts, comprising:

a. first bi-directional rotary drive means having a driving shaft coupled to said first rotatable shaft for driving the first roller in a normal direction of rotation to wind the ribbon on said first roller, b. second bi-directional rotary drive means having a driving shaft coupled to said second rotatable shaft for driving the second roller in a normal direction of rotation to wind the ribbon on said second roller, c. first friction clutch means mounted between said driving shaft of said first rotary drive means and said first rotatable shaft, and adapted to slip only when said driving shaft of said first drive means is driven in the reverse of its normal direction of rotation, at a speed higher than that of said rotatable shaft, d. second friction clutch means mounted between said driving shaft of said second rotatable drive means and said second rotatable shaft, and adapted to slip only when said driving shaft of said second drive means is driven in the reverse of its normal direction of rotation at a speed higher than that of said second rotatable shaft, e. first permanent brake means mounted on said first rotatable shaft for resisting rotation thereof, f. second permanent brake means mounted on said second rotatable shaft for resisting rotation thereof, g. an electric power source, and h. switching means connected between said power source and said first and second rotary drive means to supply a current to one of said drive means to cause the rotatable shaft associated therewith to be driven in its normal direction of rotation, and simultaneously to supply a current of higher strength to the other drive means to cause the driving shaft of the latter to be driven in the reverse of its normal direction of rotation at a speed higher than that of the rotatable shaft coupled to it.

2. Apparatus as set forth in claim 1 wherein said first and second rotary drive means each include a reduction unit consisting of a DC motor and a reduction unit having a large step-down ratio.

3. Apparatus as set forth in claim 2 wherein the stator of each DC motor is a permanent magnet.

4. Apparatus as set forth in claim 1 wherein each said first and said second friction clutch means includes two free-wheel halves, one of said halves being supported on the output shaft, the other of said halves being supported on the rotatable roller shaft.

5. Apparatus as set forth in claim 1 wherein the permanent brake is a magnetic power brake.

6. Apparatus as set forth in claim 2 in which the switching means comprises means for reversing the energizing current to the armatures of the motors when the ribbon has been fully unwound from either said first or said second roller and correspondingly wound onto said second or said first roller.

7. Apparatus as set forth in claim 6 wherein the means for reversing the energizing current includes a first reversing switch means for connecting said first rotary drive means to the power source, a second reversing switch means for connecting said second rotary drive means to said power source and actuator means adapted to be actuated from a first to a second position in response to the amount of ribbon wound or unwound on or off said first roller for switching said first and said second reversing switches between a first and a second position to effect reversal of current to the motors and means for coupling the actuator means to said first and said second reversing switches.

8. Apparatus as set forth in claim 7 wherein said actuator means includes a first strip attached near one end of the ribbon and extending beyond an edge thereof, a second strip attached near the other end of the ribbon and extending beyond said edge thereof and a lever pivotally supported adjacent the edge of said ribbon and adapted to be actuated from the first to the second position as said ribbon is fully wound on said first roller and from the second position to the first position as said ribbon is fully wound on said second roller.

9. Apparatus as set forth in claim 8 wherein each said first and said second friction clutch means includes two free-wheel halves, one of said halves being supported on the output shaft, the other of said halves being supported on the rotatable roller shafts.

10. Apparatus as set forth in claim 9 wherein the permanent break is a magnetic power brake.

* * * * *